A. Ball,
Polishing Metal.
N° 40,546. Patented Nov. 10, 1863.

Witnesses
Phineba Ball
James G. Arnold

Inventor
Albert Ball

UNITED STATES PATENT OFFICE.

ALBERT BALL, OF WORCESTER, MASSACHUSETTS.

IMPROVEMENT IN POLISHING-MACHINES.

Specification forming part of Letters Patent No. 40,546, dated November 10, 1863.

*To all whom it may concern:*

Be it known that I, ALBERT BALL, of the city and county of Worcester, State of Massachusetts, have invented a new Improved Polishing-Machine; and I do hereby declare the following to be a full, clear, and exact description of the construction and operation of the same, due reference being had to the accomdrawing drawings, wherein—

Figure 1:
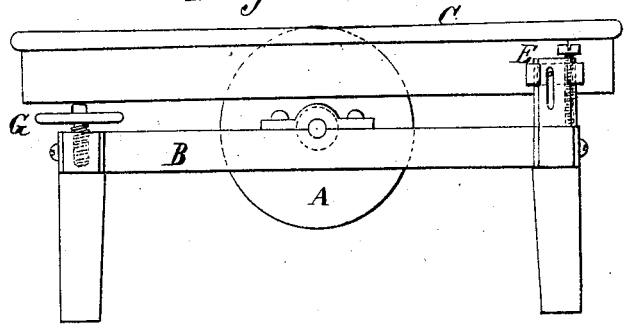
Figure 2:
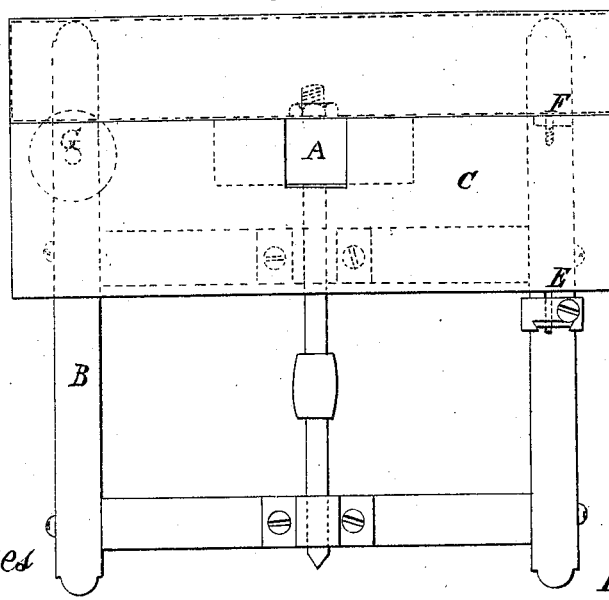

Figure 1 is a side view, and Fig. 2 is a plan, as seen from above, the same letters indicating the same parts in each.

In the construction A is the emery or polishing wheel, with its arbor supported in frame B, above which is the table C, supported by pivots at E and F, and having an adjusting-screw G to raise or lower that end, one of the pivots, as E, also having an adjusting-screw. The table C has an opening through it to allow the wheel A to come even with its upper surface, and a part of it is made to take off, (when desired,) as indicated by the red lines in Fig. 2.

The construction of the other parts may be of any convenient form suitable for the following operation—to wit: The wheel being in order and motion given to it, the table C is set by the screw E to agree with its working-face or out of wind, and the screw G, by ais-ing or lowering that end of C, gives any cut that is wanted, the mark to be polished being laid on C with its face (or surface to be polished) down next to the table, and is passed to and fro over the wheel, the table forming a guide and preventing jarring or chattering of the work on the wheel, and any projections—as flanges, &c.—may pass the side of the wheel when a part (as indicated by the red lines in Fig. 2) is removed.

It is evident that many variations may be made, as the arbor may be long enough to allow the wheel to come to the side of A to allow the projections to come close up, and the surface of the table may be grooved, or made grate-form, to avoid the dust collecting under the work, these variations not affecting the principle of my invention.

What I claim as new, and desire to secure by Letters Patent, is—

1. The adjustable table forming a guide for the surface to be polished.

2. Making the table in parts to allow projections to pass close up to the sides of the wheel, substantially as set forth and described.

ALBERT BALL.

Witnesses:
PHINEHAS BALL,
JAMES G. ARNOLD.